(12) United States Patent
Perry et al.

(10) Patent No.: US 11,359,898 B2
(45) Date of Patent: Jun. 14, 2022

(54) CURRENT FEED-THROUGH WIRELINE RELEASE TOOL AND METHOD

(71) Applicant: GEODYNAMICS, INC., Millsap, TX (US)

(72) Inventors: Brad Perry, Santo, TX (US); Roger Archibald, Hurst, TX (US)

(73) Assignee: GEODYNAMICS, INC., Millsap, TX (US)

(*) Notice: Subject to any disclaimer, the term of this patent is extended or adjusted under 35 U.S.C. 154(b) by 623 days.

(21) Appl. No.: 16/194,580

(22) Filed: Nov. 19, 2018

(65) Prior Publication Data

US 2019/0284915 A1 Sep. 19, 2019

Related U.S. Application Data

(60) Provisional application No. 62/644,828, filed on Mar. 19, 2018.

(51) Int. Cl.
| | |
|---|---|
| *F42D 1/05* | (2006.01) |
| *E21B 43/1185* | (2006.01) |
| *H02H 3/20* | (2006.01) |
| *H02H 9/02* | (2006.01) |
| *E21B 43/119* | (2006.01) |
| *F42C 15/42* | (2006.01) |
| *G01V 11/00* | (2006.01) |

(52) U.S. Cl.
CPC .............. *F42D 1/05* (2013.01); *E21B 43/119* (2013.01); *E21B 43/1185* (2013.01); *F42C 15/42* (2013.01); *G01V 11/002* (2013.01); *H02H 3/202* (2013.01); *H02H 9/025* (2013.01)

(58) Field of Classification Search
CPC ........ E21B 43/1185; F42D 1/05; H02H 9/025
See application file for complete search history.

(56) References Cited

U.S. PATENT DOCUMENTS

| | | |
|---|---|---|
| 3,529,210 A | 9/1970 | Ito et al. |
| 5,418,450 A | 5/1995 | Bacon |
| 8,695,506 B2 | 4/2014 | Lanclos |
| 9,593,542 B2 | 3/2017 | Getzlaf et al. |
| 9,915,513 B1 | 3/2018 | Zemla et al. |
| 2012/0199031 A1* | 8/2012 | Lanclos .............. E21B 43/1185 102/206 |
| 2013/0300569 A1 | 11/2013 | Lerche et al. |

(Continued)

OTHER PUBLICATIONS

Halliburton, "What Happens When Compatibility Meets Reliability?", Unconventional Completions, Frac Sleeve Systems.

(Continued)

*Primary Examiner* — Jared Fureman
*Assistant Examiner* — Christopher J Clark
(74) *Attorney, Agent, or Firm* — Morgan, Lewis & Bockius LLP

(57) ABSTRACT

A wireline release tool for downhole intervention, the tool including a housing having an electrical input and an electrical output; a pass-through switch located inside the housing and electrically connected between the electrical input and the electrical output; and a circuit limiter device located inside the housing and electrically connected between the electrical input and the electrical output. The pass-through switch is connected in parallel to the circuit limiter device, between the electrical input and the electrical output.

15 Claims, 10 Drawing Sheets

(56) References Cited

U.S. PATENT DOCUMENTS

| | | |
|---|---|---|
| 2014/0216756 A1 | 8/2014 | Getzlaf et al. |
| 2017/0096875 A1 | 4/2017 | Ravensbergen et al. |
| 2017/0138153 A1 | 5/2017 | Getzlaf et al. |

OTHER PUBLICATIONS

International Search Report and Written Opinion of the International Searching Authority (Forms PCT/ISA/220, PCT/ISA/210 and PCT/ISA/237), dated Feb. 1, 2019, for related International Application No. PCT/US 18/61734.

* cited by examiner

CURRENT FEED-THROUGH WIRELINE RELEASE TOOL AND METHOD

BACKGROUND

Technical Field

Embodiments of the subject matter disclosed herein generally relate to downhole tools for perforating/fracturing operations, and more specifically, to a wireline release tool that has a leakage current path designed around a pass-through switch.

Discussion of the Background

After a well 100 is drilled to a desired depth H relative to the surface 110, as illustrated in FIG. 1, and the casing 110 protecting the wellbore 104 has been installed and cemented in place, it is time to connect the wellbore 104 to the subterranean formation 106 to extract the oil and/or gas.

The process of connecting the wellbore to the subterranean formation may include the following steps: (1) placing a plug 112 with a through port 114 (known as a frac plug) above a just stimulated stage 116, and (2) perforating a new stage 118 above the plug 112. The step of perforating is achieved with a gun string assembly 120 that is lowered into the well with a wireline 122. A controller 124 located at the surface controls the wireline 122 and also sends various commands along the wireline to actuate one or more gun strings of the gun string assembly.

A traditional gun string assembly 120 includes plural carriers 126 connected to each other by corresponding subs 128, as illustrated in FIG. 1. Each sub 128 includes a detonator 130 and a corresponding switch 132. The detonator 130 is not connected to the through line (a wire that extends from the surface to the last gun string and transmits the actuation command to the charges of the gun string) until the corresponding switch 132 is actuated. The corresponding switch 132 is actuated by the detonation of a downstream gun string. When this happens, the detonator 130 becomes connected to the through line, and when a command from the surface actuates the detonator 130, the upstream gun string is actuated.

For a conventional perforating gun string assembly 120, carriers 126 are first loaded with charges and a detonator cord. Gun strings are then built up, one gun string at a time, by connecting the loaded carriers 126 to corresponding subs 128. Once the sub is assembled to the gun string, the wires and detonation cord are pulled through the port in the sub, allowing for the installation of the detonator, the corresponding switch, and the connection of the wirings. Those skilled in the field know that this assembly operation has its own risks, i.e., miswiring, which may render one or more of the switches and corresponding detonators unusable.

After a conventional gun string assembly has been assembled, none of the detonators are electrically connected to the through wire or through line running through the gun string assembly. This is because between each gun string there is a pressure-actuated single pole double throw (SPDT) switch. The normally closed contact on these switches connects the through wire from gun string to gun string. Once the switch has been activated by the blast of the gun string beneath (when that guns goes off), the switch changes its state, connecting the through wire coming from above to one lead of the detonator. The other lead of the detonator is wired to ground the entire time.

Further preventing the accidental detonation of a gun string is a pass-through switch 140 located between the wireline 122 and the top most gun string, inside a wireline release tool (WRT) 142. The WRT tool is capable of being electrically controlled from the surface, by the operator of the gun string, and of being mechanically disconnected from the gun string assembly for various reasons. Electrical communication between the controller 124 and the gun string assembly is thus interrupted because of the pass-through switch 140.

The WRT tool may be a polarity immune, addressable release tool meant to seamlessly support both mechanical and addressable switches. The pass-through switch 140 is bidirectional, floating (i.e., it has no defined polarity) and can be commanded to close, or by design it will close when a specific voltage threshold is reached, effecting dump fire action to the switches 132 below.

However, existing WRTs do not support ohmic testing for the switches 132 and/or detonator 130 present in the gun strings below. In other words, after assembling the gun strings, the WRT tool is designed to have the pass-through switch 140 open, thus preventing electrical contact between the surface controller and the switches 132 below the WRT tool 142.

Thus, there is a need to provide in a downhole system, which includes a pass-through switch located in a WRT tool, the capability to perform ohmic sensing/testing on various elements that are located behind the open pass-through switch of the WRT tool.

SUMMARY

According to an embodiment, there is a wireline release tool for downhole intervention. The tool includes a housing having an electrical input and an electrical output; a pass-through switch located inside the housing and electrically connected between the electrical input and the electrical output; and a circuit limiter device located inside the housing and electrically connected between the electrical input and the electrical output. The pass-through switch is connected in parallel to the circuit limiter device, between the electrical input and the electrical output.

According to another embodiment, there is a current limiter device to be placed in a wireline release tool to be used in a well. The current limiter device consists of two depletion mode transistors and a resistor connected between the two transistors.

According to yet another embodiment, there is a method for ohmic testing a gun string assembly in a well, the method including connecting a wireline release tool to a gun string, lowering the assembly into the well, applying with a current source a test current to the wireline release tool, the test current being smaller than a threshold current, so that the test current passes a current limiter device, but does not pass a pass-through switch, which is electrically connected in parallel to the current limiter device, measuring a test voltage associated with the test current, determining a status of the gun string.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a pass-through switch located in a WRT tool and another switch located in a gun string that is mechanically connected to the WRT tool. However, the embodiments discussed herein are also applicable to other tools that are connected in series, and there is a need to "see" the tools behind an open switch.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
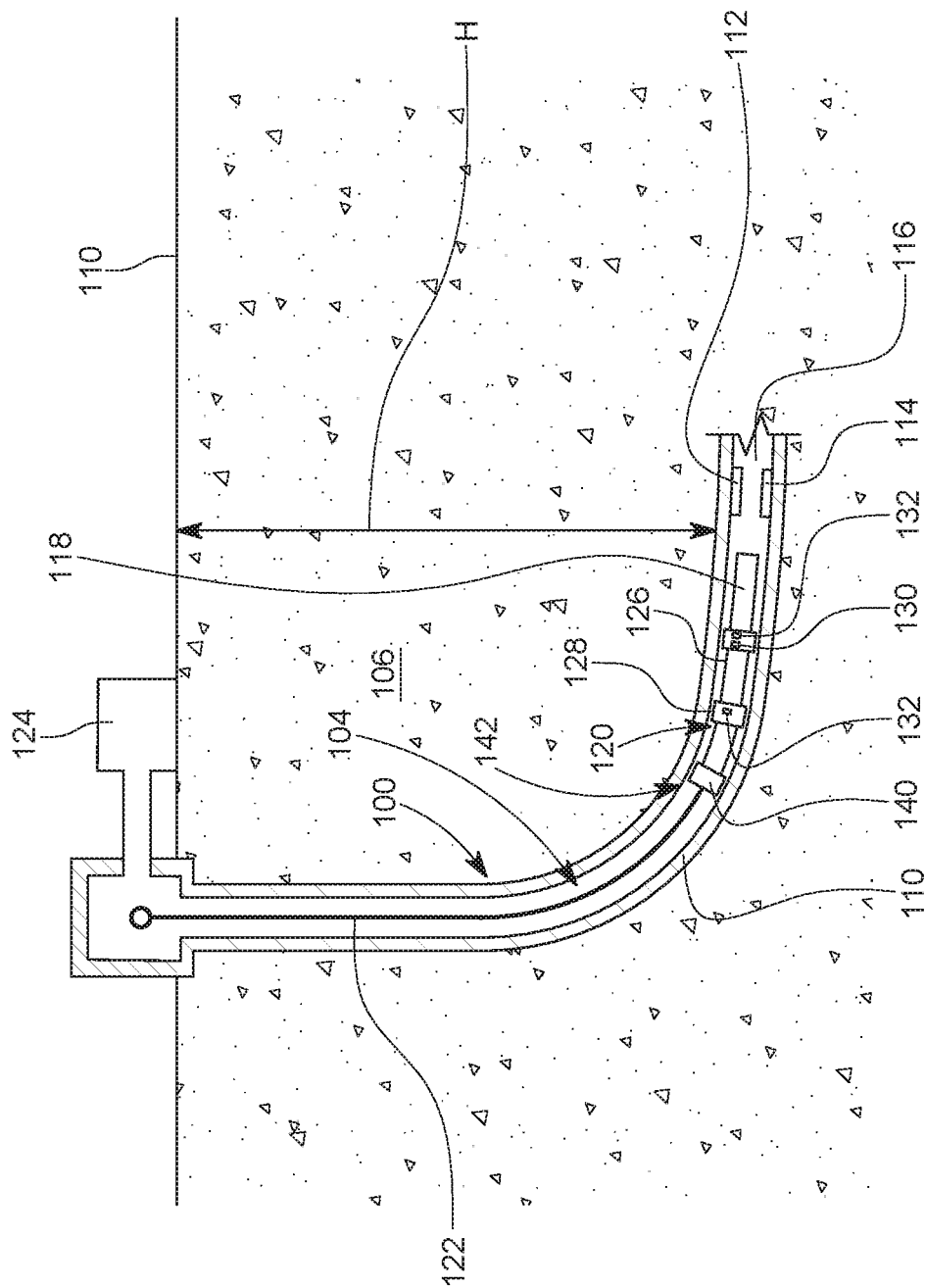
FIG. 1 illustrates a well and associated equipment for well completion operations.
Figure 2:
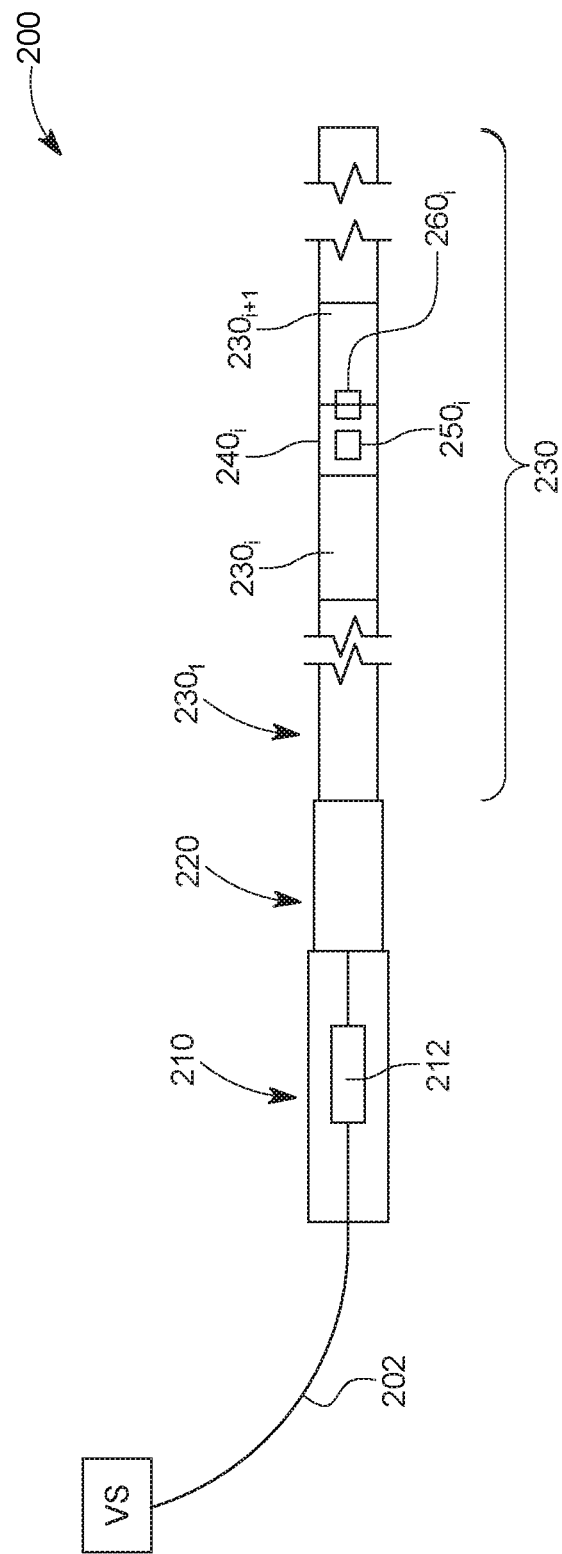
FIG. 2 illustrates a WRT tool connected between a wireline and a gun string and having a pass-through switch.

According to an embodiment illustrated in FIG. 2, a gun system 200 configured to be placed in a well, includes a WRT tool 210 that connects a wireline 202 to a Casing Collar Locator (CCL) 220 (this device is used to determine a collar on the well casing for purposes of determining a position of the WRT tool) and a gun string assembly 230. The gun string assembly 230 may include one or more gun strings 230$i$. Two adjacent gun strings 230$_i$ and 230$_{i+1}$ are connected to each other through a corresponding sub 240$_i$, and the sub 240$_i$ includes a corresponding sub switch 250$_i$ (e.g., a mechanical switch). A detonator 260$_i$ may also be present and associated with each sub 240$_i$. As previously discussed, the WRT tool 210 includes a pass-through switch 212 that electrically disconnects from the wireline 202 all the switches and gun strings behind the WRT tool. The term "behind" is understood herein to mean any element that is downstream from the WRT tool when the gun system 200 is placed in the well.

Pass-through switch 212 is configured to not conduct electrical current (i.e., it is open by default) unless a voltage on the upstream end of the pass-through switch 212 is over a threshold voltage (for example, 35V, in this embodiment, but other values may be used), in which case the pass-through switch 212 closes and a current passes downstream to the gun string assembly. Note that the pass-through switch 212 is controlled from the surface with a voltage source VS as illustrated in FIG. 2. Due to the electrical connections of the gun string assembly, the electrical current is directed to the last sub switch (most distal or downstream switch in the gun string assembly), which is associated with the most distal gun string in the gun string assembly and then, a detonator that is connected to that sub switch can be actuated if a certain current is applied.

However, as previously discussed, there is a desire to be able to send a current down to the gun string assembly without the danger of detonating any detonator and without closing the pass-through switch 212 located in the WRT tool 210. In other words, it is desired to perform various ohmic testing or sensing of the various elements of the gun string assembly 230, without changing a state of the pass-through switch 212, although these various elements of the gun string assembly 230 are electrically located behind the pass-through switch 212. More specifically, the pass-through switch is designed to allow the WRT tool to be communicated without being loaded down by the bottom detonator. A leakage path described next and implemented as a current limiter is designed to allow an up-hole current source to sense the bottom detonator. The current limiter actually limits the current when the WRT tool is being communicated with, because this will be a surface voltage source capable of much more than 20 mA, but will operate below the 35V pass-through voltage. Thus, when communication with the WRT tool is taking place, the current limiter is railed out, metering out 20 mA to the bottom detonator while the WRT communication process is going on.

Figure 3:
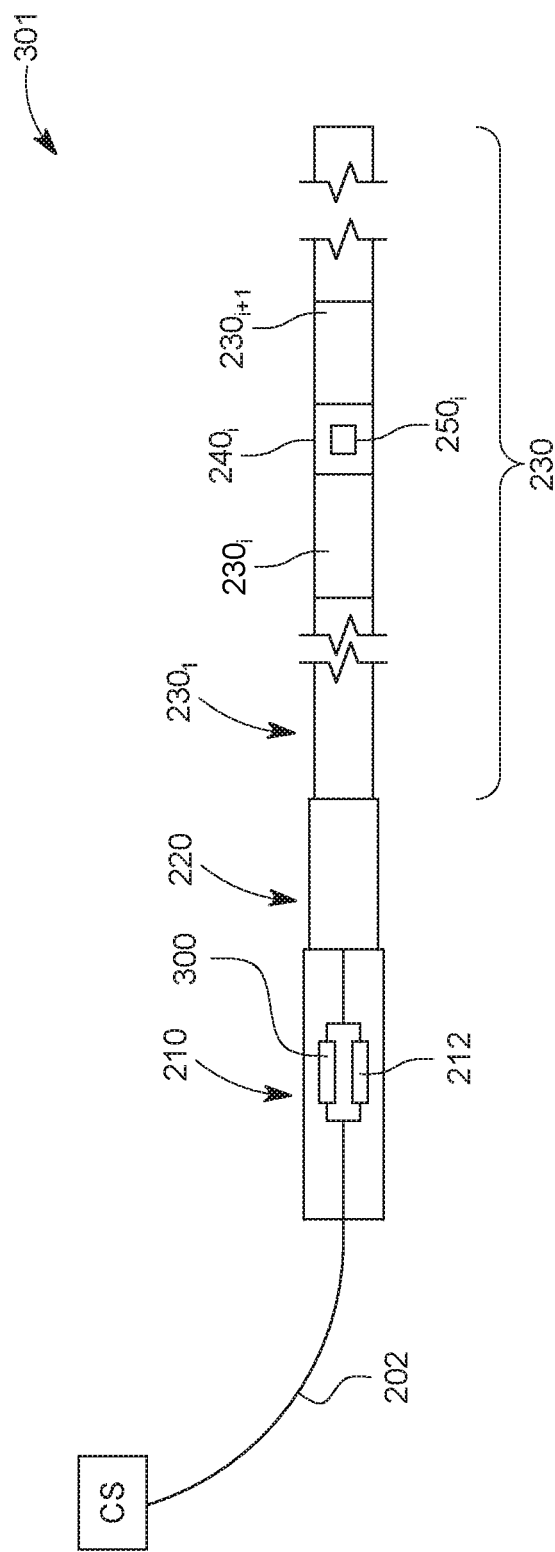
FIG. 3 illustrates a WRT tool having a pass-through switch and a current limiter device.

A solution to this problem of the existing gun assemblies is illustrated in FIG. 3, which shows a downhole tool assembly 301 that has a leakage path (implemented as a current limiter device 300) around the pass-through switch 212 and a current source CS that generates small test currents. This leakage path is designed, as discussed later, to accommodate the small test currents from the current source CS while limiting any current that is approaching the no-fire current, i.e., a current that will close the pass-through switch 212 and prepare the gun string for being fired. The current limiter device 300 includes various electrical components that achieve the leakage path, thus essentially short-circuiting the pass-through switch 212 for small currents. However, as soon as the current in the current limiter device 300 reaches a certain threshold, the current limiter device blocks any current larger than the certain threshold, in effect interrupting the leakage path and returning the WRT tool to its initial design of being controlled by the pass-through switch 212.

For example, the operator of the well uses either a blaster meter or an equivalently designed current source CS (e.g., a current source as in a standard shooting panel) to push a known current (test current herein) down the wireline to measure the total voltage at the head of a gun string. This measurement will help the operator to make a decision of whether known components (e.g., detonator or sub switch or both) of the gun string seem to be electrically present. In one embodiment, this test current is 1-2 mA at 6-20 V. In one application, the current is smaller than 3 mA. This test current accommodates the pair of diodes in the CCL 220, the switch steering diodes, as well as the 50 ohm detonators themselves. For example, a bidirectional current limiter device 300 around the pass-through switch 212 is designed to allow a passage of a current that may be 10 times larger than the necessary test current, while also being 10 times lower than the no-fire current. This needs to be accomplished at the lowest voltage drop possible, as every volt added to the measurement makes the desired portion harder to discern by adding offset and bringing the measurement device closer to running out of voltage compliance.

The current limiter device 300 is desired to be as simple, passive and small as possible, while keeping the measurement compliance down to a minimum. Various possible implementations of such a current limiter device are now discussed with regard to the FIGS. 4-6.

Figure 4:
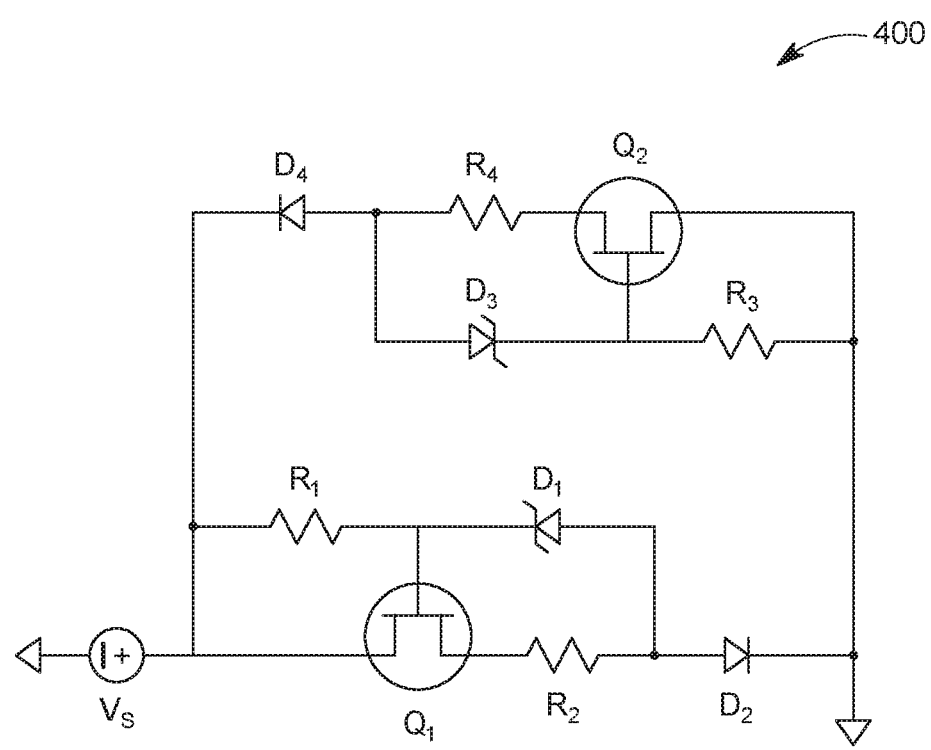
FIG. 4 shows a current limiter device.

FIG. 4 shows a current limiter device 400 that uses current Zener diodes D1 and D3. However, these diodes are not available over 100V rating and add a 2-3V drop. They would also need to be paralleled to accommodate current in both directions, which necessitates steering diodes D2 and D4, which add yet more voltage drop. Enhancement mode FET transistors Q1 and Q2 are used in the device 400, but this solution has a voltage drop of about 3-4 V. The enhancement mode means that the transistor is OFF when the gate-source voltage $V_{gs}$ is zero. A depletion mode FET transistor is ON when the gate-source voltage is zero. In this embodiment, the resistors R1=R3 are about 1 k and resistors R2=R4 are about 300 ohm. Vs represents the source current.

The configuration shown in FIG. 4 may be modified to achieve a depletion mode FET current limiter. This current limiter would have duplicate circuits and steering diodes. However, a bidirectional depletion current limiter was designed, which does not use steering diodes. This circuit not only uses fewer parts, but has a lower overall voltage drop due to the absence of these diodes, which is enabled by the default-on nature of the depletion mode devices. This circuit drops less than 0.75V with a 2 mA current passing and would limit the current to 20 mA, ensuring safe no-fire levels during WRT only addressing.

Figure 5:
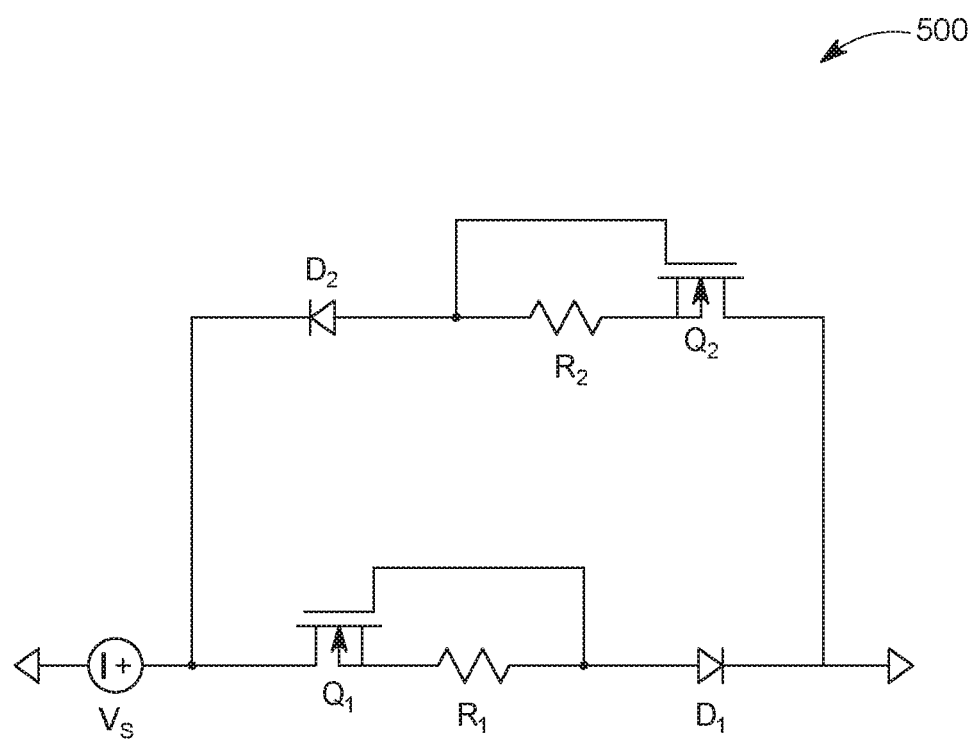
FIG. 5 shows another current limiter device.
Figure 6:
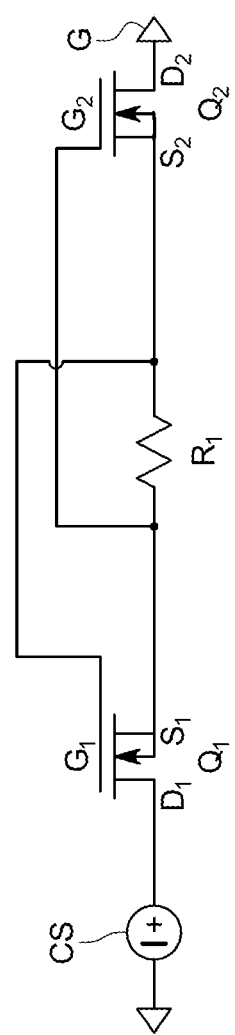
FIG. 6 shows a simplified current limiter device.

The depletion current limiter 500 shown in FIG. 5 includes depletion mode FET transistors Q1 and Q2, electrically connected to driving diodes D1 and D2 and resistors R1 and R2. A more advantageous depletion current limiter device 600 is shown in FIG. 6, and this current limiter device has no steering diodes. The depletion mode current limiter device 600 includes only two depletion mode FET transistors Q1 and Q2 and a single resistor R. The resistor is connected between the source S1 of the first transistor Q1 and the source S2 of the second transistor Q2. The gate G1 of the first transistor Q1 is connected to the source S2 of the second transistor Q2 and the gate G2 of the second transistor Q2 is connected to the source S1 of the first transistor Q1. The drain D1 of the first transistor Q1 is connected to the current source CS and the drain D2 of the second transistor Q2 is connected to ground G.

Figure 7:
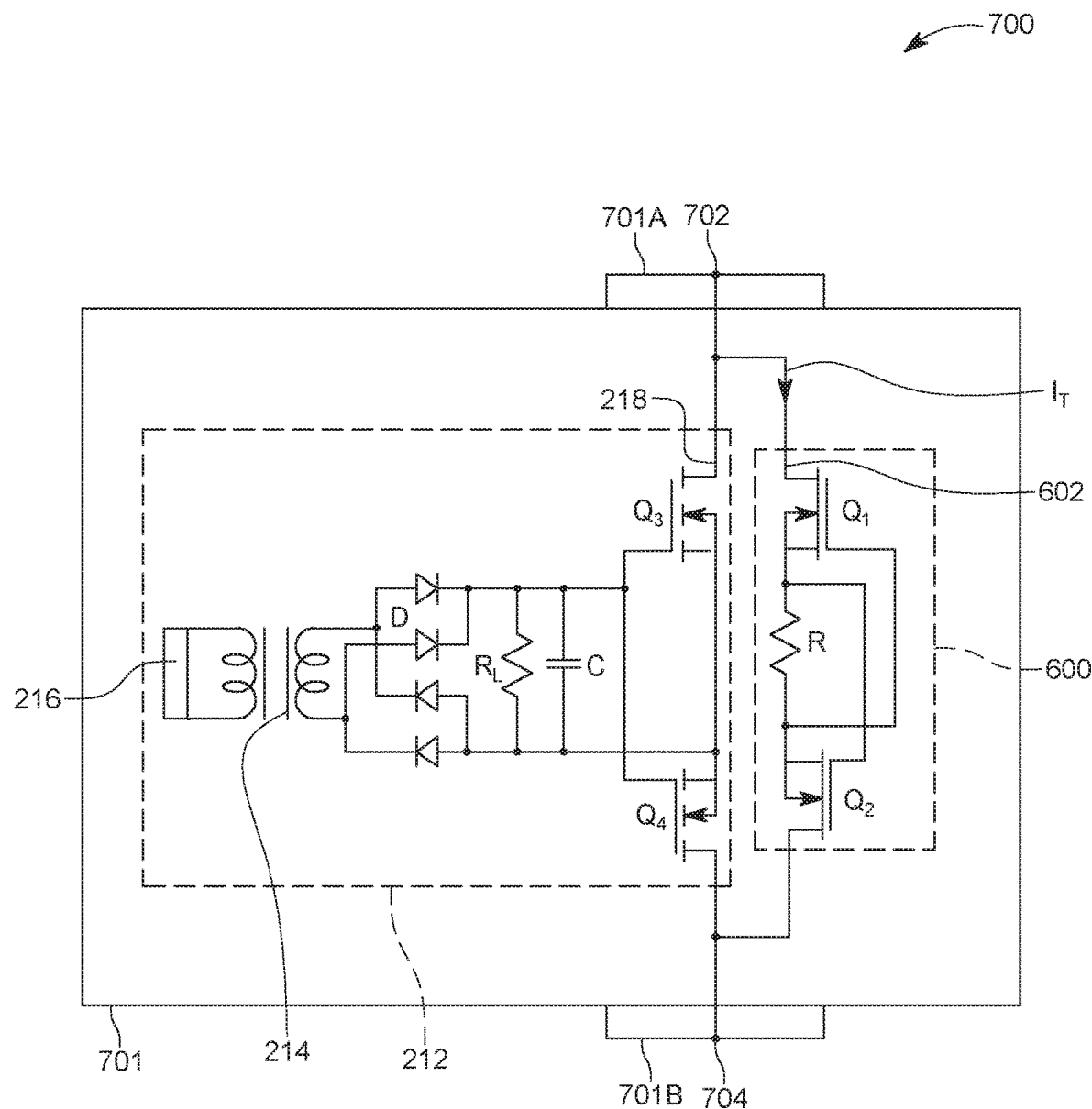
FIG. 7 shows a WRT tool having the pass-through switch and the current limiter device of FIG. 6.

FIG. 7 shows a WRT tool 700 that has a housing 701 that includes the current limiter device 600. WRT tool 700 has an input 702 and an output 704 that electrically connect to the wireline and the CCL device, respectively. The input 702 and output 704 may be located on the housing 701. The housing 701 has a first end 701A that is configured to be attached to the wireline 202 and a second end 701B that is configured to be attached to the CCL 220. Both the current limiter device 600 and the pass-through switch 212 are electrically connected between the input 702 and the output 704 so that the current limiter device 600 and the pass-through switch 212 are in parallel. The pass-through switch 212 is shown in this embodiment as having enhancement mode transistors Q3 and Q4 while the current limiter device 600 has depletion mode transistors Q1 and Q2. The pass-through switch 212 has an isolated drive 214, that transmits a signal from an oscillator drive 216. The signal is transmitted to plural diodes D, which together with a resistor $R_L$ and a capacitor C switch off the load current path 218.

As previously discussed, the current limiter device 600 is configured to allow a small current (test current) $I_T$ to pass through, along the current limiter path 602, when a current source CS is connected to the wireline. When the voltage $V_T$ generated by this current along the current limiter device (which is given by the product of the test current $I_T$ and the resistance of resistor R) becomes larger than a certain threshold (e.g., 3-5V), the current limiter device limits the current from increasing through the current limiter device. Thus, the testing phase is performed with the current source CS connected to the wireline and the generated current by-passes the pass-through switch 212 via the current limited device 600. When the operator of the well switches from the testing phase to the detonation phase, the current source CS is replaced by the voltage source VS. If the applied voltage at terminal 702 increase over a given value (e.g., 35 V), the voltage generated across the pass-through switch 212 turns ON the switch, and the current passes the WRT tool along the load current path 218 and the gun string assembly can be fired. This means that a current I that is applied to input 702 during the testing phase with the current source, if smaller than a threshold current $I_{treshold}$, would only pass along the current limiter path 602. If a current I applied with a voltage source during the detonation phase forces the tool head voltage above the given value (e.g., 35V as discussed above), the current follows the load current path 218. When the test current generate with the current source during the testing phase is smaller than the threshold current $I_{treshold}$, there is no danger of setting off the guns in the gun string assembly, but that current can be used as a test current to perform various tests of the gun strings behind the WRT tool. An advantage of the current limiter device discussed herein is that when the WRT tool is being accessed from the surface, and the voltage at its head is below the given value (e.g., 35 V) so that the pass-through switch is not enable, the current limiter device rations no more than 20 mA of current to leak around the pass-through switch, which guarantees a current 10× less than the no fire current in the detonator. This means that testing can be performed (the testing path stays safe) even during a non-testing situation, when voltages are below the given value that would close the pass-through switch.

Figure 8:
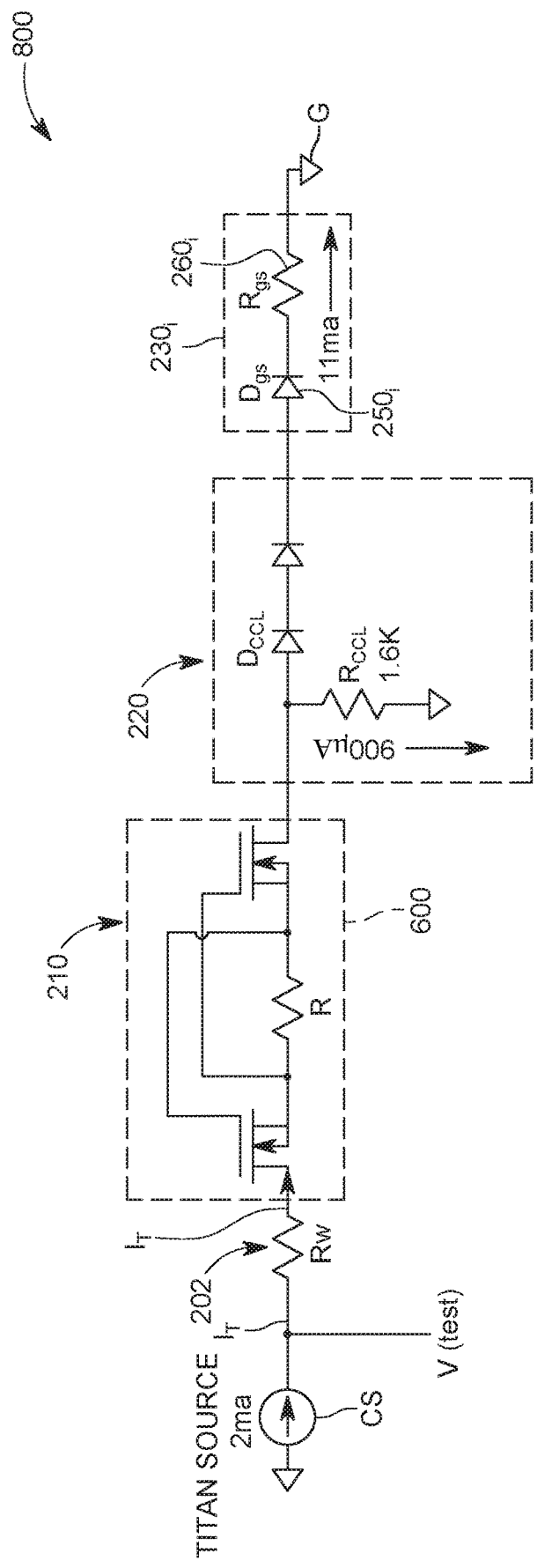
FIG. 8 shows an electrical path from the surface to downhole tools.

FIG. 8 shows the relevant electrical components along the entire current path, from the current source CS located on the ground or in a truck at the head of the well, to the end of the last downhole tool 230i. More specifically, FIG. 8 shows a system 800 that includes a current source CS that generates the test current. In this embodiment, the current source CS may be a Titan source and the test current may have a value of 2 mA. The Titan source is a feature of a Titan shooting panel in a wireline truck (not shown). In one application, the current source might be a digital meter in the resistance check mode. The wireline 202 is connected to the current source CS and extends to the WRT tool 210. The wireline 202 is characterized by a resistance Rw, which may be around 200 ohm, depending on the manufacturer.

For the WRT tool 210, only the current limiter device 600 is relevant from an electrical point of view, for small currents. For this reason, only the current limiter device 600 is shown as being inside the WRT section 210 in FIG. 8. The current limiter device 600 is characterized by a resistance R. Resistance R depends on the threshold value of the transistors used in the current limiter device 600. For the sake of an example, if the resistance R is about 280 Ohms, the test current $I_T$ will pass through the current limiter device 600 with only the ohmic drops associated with its "on" resistance R, which for this specific example is 2 mA×280 Ohms (=560 mV drop). The maximum desired current limit to pass through the resistor R to develop a voltage that is equal to the transistor's threshold voltage may be specified in a datasheet. Every transistor is different and depends on the part number used. Thus, depending on the transistors used in the current limiter device 600, different resistances and voltage drops are obtained. Irrespective of which transistor is selected for the current limiter device, the current limit is selected so that there is no danger of activating the detonator by placing the current limit at 10× less than no-fire current of the detonator. In this embodiment the selected current limit is 20 mA. The current limiter device 600 is placed in parallel with the WRT pass-through switch 212, as illustrated in FIG. 7, so that in effect, this embodiment allows a test current to pass through a "leaky" path, so that the gun string can be tested on an otherwise unpowered tool string. However, this leaky path will limit the leaky current as discussed above to ensure no-fire operation with a powered tool.

The WRT tool 210 is mechanically and electrically connected to the CCL 220. The CCL 220 is located at the top of the gun string 230i. The CCL 220 is represented, from an electrical point of view, by a resistor Rccl and two diodes Dccl. The resistor Rccl may have a value of about 1.6 kohm and it may constitute a leaked current path. The test current, after passing the two diodes Dccl, arrives to the gun string 230i. Each gun string 230i is electrically characterized by a diode Dgs and a resistor Rgs, which has a value of about 50 ohm.

The addition of the current limiter device 600 to the WRT tool 210 results in making a near perfect floating, bidirectional switch (i.e., the pass-through switch 212), 'leaky' or imperfect, but with a very specific behavior. This behavior is to interfere as little as possible with the 1-2 mA test current, and never let more than 20 mA (threshold current) pass through. The current limiter device is designed to pinch the current generated by any surface source at $I_{threshold}$, to prevent an accidental firing of the detonators. It is the job of the floating pass-through switch 212, when turned on with the voltage source, to pass the currents higher than $I_{threshold}$ for firing the detonators. The result of adding this leaky path around the pass-through switch is to allow the testing phase to 'see' through the unpowered WRT tool, so that the operator is able to verify the healthy connection of the components of the rest of the gun string. By using the end value, V(test)/I(test), a set of boundary conditions can be used to decide if various wires/connections/components below the WRT tool are shorted or cut open or damaged, and whether to proceed with the perforation job or not. Note that the WRT tool is traditionally used to release the gun string assembly when the presence of shorted guns is detected.

As previously discussed, the current limiter device may be implemented in various ways. While FIG. 6 shows one implementation in which only two transistors and one resistor are used, the current limiter device may be implemented with current regulator diodes, other types of transistors, integrated circuit regulators, as a fuse, etc. This source can be of either polarity, and the right side that is grounded is considered the load side. The current limiter device of the embodiment of FIG. 6 includes two depletion mode, N-channel MOSFET transistors and a single resistor. These transistors are normally closed (conducting) and require a negative Gate to Source voltage to turn them off. In one application, they have roughly 40 ohms of resistance in the on state. This device can be looked at as conducting by default with roughly 250-280 ohms of resistance. It takes current to flow and a specific threshold to cause this circuit to limit (pinch off) the current. However, as illustrated in FIGS. 4 and 5, this circuit can be modified to include other elements (e.g., diodes) and/or other type of transistors.

According to an embodiment, communications between a controller at the surface (e.g., element 124) and the WRT tool is based on a frequency-shift keying (FSK) communication scheme. Binary data is encoded into the FSK scheme and the data is driven over the wireline (the thru-line), where each bit is represented by, for example, 1.5 ms of pulses. In one application, a zero is represented by 4 cycles of 2.666 kHz and a one is represented by 6 cycles of 4 kHz. These are exemplary numbers and those skilled in the art would understand that other values may be used. Other modulation schemes may be used for the communications between the controller and the WRT tool and/or the switches below.

In one application, the pass-through switch of the WRT tool can be enabled/disabled via the WRT control board. On power-up, the pass-through switch is disabled until the WRT head voltage passes V max (e.g., V max=35V). When the head voltage passes V max, the control board will automatically close the switch 212 and the head voltage will be passed through to lower downhole tools. This will enable the user to power up the downhole tools to a lower voltage, for example 25V, and issue a command to release or disable the feedthrough, giving the ability to isolate any tools/guns below the WRT. Various commands can be used to explicitly enable or disable the feedthrough if needed. If a command to disable the feedthrough is received before the WRT voltage reaches 35V, the feedthrough will not automatically be enabled when 35V is reached. After a Release operation, the feedthrough will not be automatically enabled. This is to prevent the possibility of accidentally activating an explosive if the operator applies release voltage after the initial release sequence has finished.

The release operation performed by a WRT tool is now discussed. The WRT release command functions similarly to the fire command of an addressable switch. When the WRT successfully receives a release command, it will initiate a predetermined time countdown (e.g., 45 s). If, during that predetermined time countdown the head voltage passes a release voltage (e.g., 140 V), the solenoid will be activated to initiate release. The control board will drive the solenoid until it senses a release via microswitch activation, or until it times out after a given time.

Figure 9:
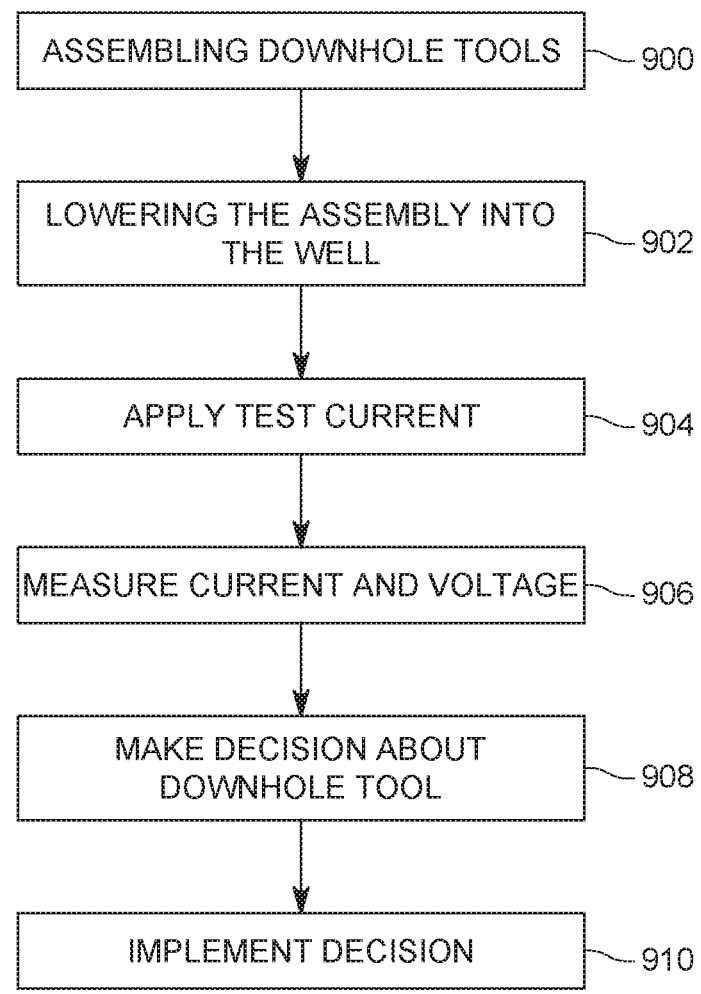
FIG. 9 is a flowchart of a method for using a WRT tool having the pass-through switch and the current limiter device.

The various embodiments discussed above may be implemented as now discussed. According to an embodiment illustrated in FIG. 9, there is a method for testing a downhole tool located in a well, and electrically insulated from the surface. The method includes a step 900 of assembling various downhole tools to be lowered into the well. This step includes attaching a wireline to a WRT tool, attaching the WRT tool to a CCL, and attaching the CCL to one or more gun strings. Then, in step 902, the assembly is lowered into a well. In step 904, a test current is applied to the WRT tool with a current source. The test current, which is smaller than a threshold current, passes through a current limiter device 600 but not through a pass-through switch 212 of the WRT tool. The current limiter device 600 is mounted in parallel to the pass-through switch 212. In step 906, the test current and a voltage test, which corresponds to the test current, are measured. The voltage test is generated by the test current passing through a detonator, and/or a switch located in the last gun string. Based on a value of the test current, or the voltage test, or a combination of the test current and the voltage test (for example, a ratio of the voltage test and the current test), the operator of the well determines in step 908 a status of the tested tool, e.g., the gun string is ready to be fired, the gun string is disabled, the gun string is not present, etc. Thus, in step 910, a decision is implemented, i.e., the gun is fired, the gun is released from the WRT tool, the WRT tool should be retrieved, etc. If the specific action taken is firing the gun string up, the current source needs to be replaced by a voltage source. After the gun string has been fired with the help of the voltage source, the method may be repeated for the next gun string, as the firing of the previous gun string arms a switch which electrically connects to the WRT tool the next gun string. This process may be repeated after the firing of each gun string in the gun string assembly, so that each gun string can be tested before being fired. In this way, ohmic testing of each downhole tool may be performed although the pass-through switch of the WRT tool is open.

Figure 10:
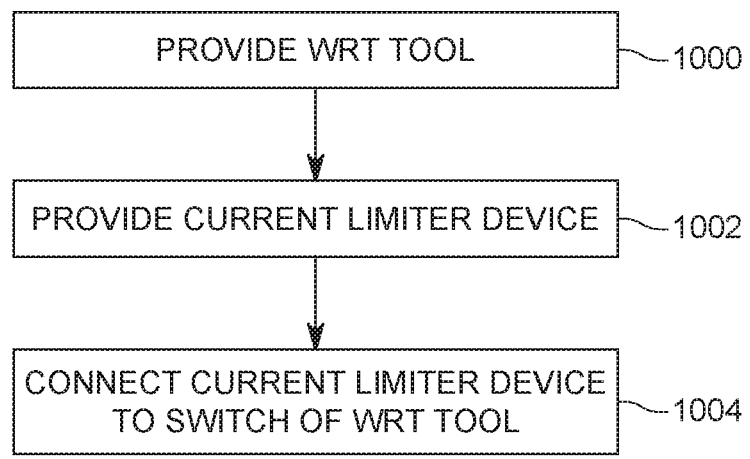
FIG. 10 is a flowchart of a method for manufacturing the WRT tool having the pass-through switch and the current limiter device.

A method for manufacturing a WRT tool having the current limiter device 600 is now discussed with regard to FIG. 10. In step 1000, a WRT tool is provided. In step 1002, a current limiter device 600 is provided. In step 1004 the current limiter device 600 is added to the WRT tool, so that a pass-through switch 212 of the WRT tool is in parallel with the current limiter device 600. The current limiter device 600 allows a test current to pass while the pass-through switch is open. The test current is smaller than a threshold current. When the current reaches or passes the threshold current, the current limiter device blocks the current from further increasing.

The disclosed embodiments provide methods and systems for ohmic testing a downhole tool without closing a pass-through switch in a WRT tool. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A wireline release tool for downhole intervention, the tool comprising:
   a housing having an electrical input and an electrical output;
   a pass-through switch located inside the housing and electrically connected between the electrical input and the electrical output, the pass-through switch including two enhancement mode transistors; and
   a current limiter device located inside the housing and electrically connected between the electrical input and the electrical output, the current limiter device including two depletion mode transistors,
   wherein the pass-through switch is connected in parallel to the current limiter device, between the electrical input and the electrical output, and
   wherein the two enhancement mode transistors are configured to be OFF when a gate-source voltage is zero and the two depletion mode transistors are configured to be ON when the gate-source is zero.

2. The wireline release tool of claim 1, wherein the current limiter device allows a test electrical current, smaller than a threshold current, to pass while the pass-through switch does not allow the test electrical current to pass.

3. The wireline release tool of claim 2, wherein the current limiter device limits a current from increasing past the threshold current.

4. The wireline release tool of claim 2, wherein the pass-through switch is open while the test electrical current passes through the current limiter device.

5. The wireline release tool of claim 4, wherein the threshold current is 20 mA and the test electrical current is smaller than 3 mA.

6. The wireline release tool of claim 2, wherein the threshold current times a resistance of the current limiter device equals a voltage that is smaller than a voltage that closes the pass-through circuit.

7. The wireline release tool of claim 1, wherein the current limiter device comprises:
   the two depletion mode transistors and a resistor.

8. The wireline release tool of claim 7, wherein the two transistors are N-channel mosfet transistors.

9. The wireline release tool of claim 7, wherein the resistor is the only resistor in the device.

10. The wireline release tool of claim 7, wherein there are no other electrical components of the current limiter device.

11. The wireline release tool of claim 7, wherein a drain of the first transistor is connected to the electrical input, a source of the first transistor is connected to a first side of the resistor, and a gate of the first transistor is connected to a second side of the resistor.

12. The wireline release tool of claim 11, wherein a drain of the second transistor is connected to ground, a source of the second transistor is connected to the second side of the resistor, and a gate of the second transistor is connected to the first side of the resistor.

13. The wireline release tool of claim 1, wherein the housing has a first end that is attached to a wireline and a second end that is attached to a casing locator.

14. A method for ohmic testing a gun string assembly in a well, the method comprising:
   connecting a wireline release tool to a gun string;
   lowering the assembly into the well;
   applying with a current source a test current to the wireline release tool, the test current being smaller than a threshold current, so that the test current passes a current limiter device, but does not pass a pass-through switch, which is electrically connected in parallel to the current limiter device;
   measuring a test voltage associated with the test current; and
   determining a status of the gun string,
   wherein the pass-through switch includes two enhancement mode transistors and the current limiter device includes two depletion mode transistors, and
   wherein the two enhancement mode transistors are configured to be OFF when a gate-source voltage is zero and the two depletion mode transistors are configured to be ON when the gate-source is zero.

15. The method of claim 14, further comprising:

applying with a voltage source a voltage larger than a threshold voltage to close the pass-through switch.

\* \* \* \* \*